(12) United States Patent
Liang et al.

(10) Patent No.: US 12,051,776 B2
(45) Date of Patent: Jul. 30, 2024

(54) METHOD FOR PREPARING SODIUM SUPER IONIC CONDUCTOR SOLID ELECTROLYTE BY LOW-DIMENSIONAL CRYSTALLIZATION

(71) Applicants: KUNMING UNIVERSITY OF SCIENCE AND TECHNOLOGY, Kunming (CN); JIANGSU FENGCHI CARBON BASED NEW MATERIAL RESEARCH INSTITUTE CO., LTD, Xuzhou (CN)

(72) Inventors: Feng Liang, Kunming (CN); Minjie Hou, Kunming (CN); Da Zhang, Kunming (CN); Tao Zhang, Xuzhou (CN); Sunzu Xiang, Xuzhou (CN); Wenlong Jiang, Kunming (CN); Baoqiang Xu, Kunming (CN); Bin Yang, Kunming (CN)

(73) Assignees: KUNMING UNIVERSITY OF SCIENCE AND TECHNOLOGY, Kunming (CN); JIANGSU FENGCHI CARBON BASED NEW MATERIAL RESEARCH INSTITUTE CO., LTD, Xuzhou (CN)

(*) Notice: Subject to any disclaimer, the term of this patent is extended or adjusted under 35 U.S.C. 154(b) by 0 days.

(21) Appl. No.: 18/537,953

(22) Filed: Dec. 13, 2023

(65) Prior Publication Data
US 2024/0222697 A1 Jul. 4, 2024

Related U.S. Application Data

(63) Continuation of application No. PCT/CN2022/143698, filed on Dec. 30, 2022.

(51) Int. Cl.
*H01M 10/0562* (2010.01)

(52) U.S. Cl.
CPC ............ *H01M 10/0562* (2013.01); *H01M 2300/0068* (2013.01)

(58) Field of Classification Search
None
See application file for complete search history.

(56) References Cited

U.S. PATENT DOCUMENTS 5,140,005 A * 8/1992 Rangaswamy ........ C01G 3/006
423/594.16
2021/0155480 A1 5/2021 Son et al.
(Continued)

FOREIGN PATENT DOCUMENTS

CN 109659603 A 4/2019
CN 112864453 A 5/2021
(Continued)

*Primary Examiner* — Scott J. Chmielecki
(74) *Attorney, Agent, or Firm* — Daniel M. Cohn; Howard M. Cohn (57) ABSTRACT

A method for preparing a sodium super ionic conductor solid electrolyte by low-dimensional crystallization belongs to a field of energy materials. The method is based on the theory of negative ion coordination polyhedron growth unit, and uses low-temperature plasma as a protective gas of a spray drying equipment. While evaporating the solvent in a sodium super ionic conductor solid electrolyte precursor slurry, plasma active groups modify the particle surface of the sodium super ionic conductor solid electrolyte precursor particles in-situ. A free space dimension of crystal growth in the crystallization process is reduced, and directional growth of crystals in the solid phase sintering process is induced. Secondly, the dispersion stability of the sodium super ionic conductor solid electrolyte precursor particles is improved. Compared with the traditional high-temperature solid-state sintering process, the method has the advantages of fast crystallization speed, high crystal purity and integrity, good compactness, and uniform particles.

10 Claims, 9 Drawing Sheets

Precursor slurry preparation: Weigh raw materials according to a preset chemical formula $Na_xZr_2Si_{x-1}P_{4-x}O_{12}$ (wherein, $1 \leq x \leq 4$); a grinding solvent is added, followed by ball milling pretreatment and sand milling nano treatment to obtain a sodium super ionic conductor solid electrolyte precursor slurry.

Plasma-assisted spray drying granulation: The sodium super ionic conductor solid electrolyte precursor slurry is spray-dried and granulated in a spray drying tower, and the plasma atmosphere is passed into the spray drying tower simultaneously to obtain sodium super ionic conductor solid electrolyte precursor particles with surfaces modified in-situ by plasma active groups.

Sodium super ionic conductor solid electrolyte precursor particle sintering: Sodium super ionic conductor solid electrolyte precursor particles are put into a muffle furnace for sintering so as to obtain the sodium super ionic conductor solid electrolyte.

(56) References Cited

U.S. PATENT DOCUMENTS

2024/0047657 A1\* 2/2024 Zhou ................. C01B 25/45
2024/0055610 A1\* 2/2024 Zhu .................. H01M 10/04

FOREIGN PATENT DOCUMENTS

CN       113690483 A     11/2021
CN       114267872 A     4/2022

\* cited by examiner

Precursor slurry preparation: Weigh raw materials according to a preset chemical formula $Na_xZr_2Si_{x-1}P_{4-x}O_{12}$ (wherein, $1 \leq x \leq 4$); a grinding solvent is added, followed by ball milling pretreatment and sand milling nano treatment to obtain a sodium super ionic conductor solid electrolyte precursor slurry.

Plasma-assisted spray drying granulation: The sodium super ionic conductor solid electrolyte precursor slurry is spray-dried and granulated in a spray drying tower, and the plasma atmosphere is passed into the spray drying tower simultaneously to obtain sodium super ionic conductor solid electrolyte precursor particles with surfaces modified in-situ by plasma active groups.

Sodium super ionic conductor solid electrolyte precursor particle sintering: Sodium super ionic conductor solid electrolyte precursor particles are put into a muffle furnace for sintering so as to obtain the sodium super ionic conductor solid electrolyte.

METHOD FOR PREPARING SODIUM SUPER IONIC CONDUCTOR SOLID ELECTROLYTE BY LOW-DIMENSIONAL CRYSTALLIZATION

CROSS-REFERENCE TO RELATED APPLICATIONS

The application is a continuation of International Application No. PCT/CN2022/143698 filed on Dec. 30, 2022.

TECHNICAL FIELD

The invention relates to the field of new energy materials, in particular to a method for preparing a sodium super ionic conductor solid electrolyte by low-dimensional crystallization.

BACKGROUND

Driven by the strategic goal of carbon neutrality, led by energy storage technology, the controllable dispatch of energy can be realized on the power generation side, power transmission and distribution side, and power consumption side, so as to ensure the large-scale application of renewable energy and improve system efficiency of the conventional power system and regional energy. Driving the development of end-use technologies such as electric vehicles, and establishing a "safe, economical, efficient, low-carbon, and shared" energy system has become the only way for the "energy revolution" strategy.

Traditional secondary batteries mostly use liquid electrolytes, and liquid organic electrolytes may leak and explode at too high temperature, causing safety accidents, and cannot be used in some occasions that require high safety; liquid electrolyte ion batteries generally have the problem of cycle capacity fading, and gradually fail due to the dissolution and reaction of electrode active materials in the electrolyte after a period of use. The all-solid-state battery has high safety and basically no cycle capacity fading. The solid electrolyte also acts as a diaphragm, which simplifies the structure of the battery. In addition, since there is no need to isolate the air, the requirements for equipment in the production process are simplified, and the shape design of the battery is also more convenient and flexible.

Sodium-ion batteries are known as "green energy for the 21st century". Compared with traditional lithium batteries, sodium-ion batteries have the advantages of abundant raw material reserves, low production costs, high safety performance, wide operating temperature range, and environmental friendliness. The large-scale application of sodium-ion batteries can meet corresponding needs of new power systems. However, when sodium metal is used as the negative electrode, the growth of sodium dendrites will pierce the separator and cause internal short circuit of the battery, resulting in problems such as thermal runaway, flammability and explosion. The use of solid electrolytes is expected to fundamentally solve the safety problems brought by organic electrolytes. In addition, solid-state electrolytes have the following advantages: 1) high safety, avoiding leakage and flammability problems, and reducing battery pack packaging requirements; 2) expandable electrochemical window; 3) high energy density. Therefore, the development of solid-state sodium-ion batteries not only has a wide range of application prospects, enough to cause revolutionary changes in energy storage devices and applications, but also plays a very important role in energy security strategies.

Sodium-based solid electrolytes are mainly divided into inorganic solid electrolytes and polymer solid electrolytes. As a representative material of inorganic solid electrolyte, sodium super ionic conductor solid electrolyte has a general chemical formula of $Na_xZr_2Si_{x-1}P_{4-x}O_{12}$ ($1 \leq x \leq 4$), which has a skeleton structure composed of $PO_4$ tetrahedron and $MO_6$ octahedron (such as M=Zr, Si), which produces structural holes and fillable coordination, and constitutes a continuous three-dimensional channel for the migration of sodium ions. At present, the preparation methods of such solid electrolytes mainly include high-temperature solid-phase method, solution-assisted solid-phase method, and sol-gel method. Because sodium and phosphorus are highly volatile at high temperature, the impurity phase of zirconia is precipitated, and the component content is not easy to control, resulting in impure sodium super ionic conductor solid electrolyte, uneven particle size distribution, and reduced ion conductivity. Therefore, reducing the sintering temperature of the sodium super ionic conductor solid electrolyte and limiting the free growth space dimension of the crystal grains are the main ways to improve the ionic conductivity of the sodium super ionic conductor solid electrolyte prepared by the high-temperature solid-phase method.

Guided by the theory of negative ion coordination polyhedron growth unit, the present disclosure discloses a method for preparing sodium super ionic conductor solid electrolyte by low-dimensional crystallization. The low-temperature plasma is used as the protective gas of the spray drying equipment, and the powder material is modified and granulated while evaporating the solvent of the precursor slurry. Plasma active groups modify the surface of sodium super ionic conductor solid electrolyte precursor particles in-situ. The directional crystal growth is induced by the anion coordination polyhedron, which reduces the free space dimension of the crystal growth during the crystallization process of the high-temperature solid phase sintered sodium super ionic conductor solid electrolyte precursor particles. Secondly, the dispersion stability of the sodium super ionic conductor solid electrolyte precursor particles is improved. Compared with the traditional high-temperature solid-state sintering process, it has the advantages of low sintering temperature, fast crystallization speed, high crystal purity and integrity, good compactness, and uniform particles.

SUMMARY

The purpose of the present disclosure is to provide a method for preparing sodium super ionic conductor solid electrolyte by low-dimensional crystallization. The surface of sodium superionic conductor solid electrolyte particles is modified in-situ by plasma active groups. The directional growth of the crystal is induced by the anion coordination polyhedron, which reduces the free space dimension of the crystal growth during the crystallization process of the high-temperature solid phase sintered sodium super ionic conductor solid electrolyte. Secondly, the dispersion stability of the sodium super ionic conductor solid electrolyte precursor particles is improved. Furthermore, the sintering temperature of the sodium super ionic conductor solid electrolyte precursor particles is reduced, and the volatilization of sodium and phosphorus elements is suppressed. The sodium super ionic conductor solid electrolyte prepared by the method has the advantages of high crystal purity and integrity, good compactness, uniform particles, high ion conductivity and the like.

In order to achieve the purpose of the above invention, the method for preparing a sodium super ionic conductor solid electrolyte by low-dimensional crystallization provided by an embodiment of the present invention includes the following steps:

Precursor slurry preparation: Weigh raw materials according to the preset chemical formula $Na_xZr_2Si_{x-1}P_{4-x}O_{12}$ ($1 \leq x \leq 4$), add grinding solvent, pretreatment by ball milling and sand milling to obtain sodium super ionic conductor Solid electrolyte precursor slurry.

Plasma-assisted spray drying granulation: the sodium super ionic conductor solid electrolyte precursor slurry is spray-dried and granulated, and the plasma atmosphere is passed into the spray drying tower simultaneously. The surface of the sodium super ionic conductor solid electrolyte precursor particle is modified in-situ with a plasma active group to obtain the sodium super ionic conductor solid electrolyte precursor particle.

Sodium super ionic conductor solid electrolyte precursor particle sintering: sodium super ionic conductor solid electrolyte precursor particle is put into muffle furnace, obtain sodium super ionic conductor solid electrolyte by a sintering.

Compared with the prior art, in the method for preparing a sodium super ionic conductor solid electrolyte by low-dimensional crystallization, plasma active groups are used to in-situ modify the surface of the sodium super ionic conductor solid electrolyte precursor particle. The directional crystal growth is induced by the anion coordination polyhedron, which reduces the free space dimension of the crystal growth during the crystallization process of the high-temperature solid phase sintered sodium super ionic conductor solid electrolyte precursor particles. Secondly, the dispersion stability of the sodium super ionic conductor solid electrolyte precursor particles is improved, and the calcination temperature of solid-phase sintering is reduced. The prepared sodium super ionic conductor solid electrolyte has the advantages of high crystal purity and integrity, good compactness, uniform particles, high ion conductivity and the like. Applied to solid-state sodium-ion batteries, it can reduce battery polarization, inhibit the growth of sodium dendrites, prolong the cycle life of batteries, and improve the electrochemical performance of battery packs. In addition, the above-mentioned low-dimensional crystallization process for preparing the sodium super ionic conductor solid electrolyte is simple, basically does not involve complex reaction processes, and reduces energy consumption and investment in equipment. There is basically no generation of "three wastes" in any process link of the present invention, which conforms to the concept of green industry and is friendly to the environment.

In the step of preparing the precursor slurry: weighing raw materials according to $1 \leq x \leq 4$ in the preset chemical formula $Na_xZr_2Si_{x-1}P_{4-x}O_{12}$. The sodium source in the raw materials is one or more of sodium chloride, sodium carbonate, sodium thiosulfate, sodium bicarbonate, sodium nitrate, and trisodium phosphate dodecahydrate. The zirconium source is zirconium dioxide, the silicon source is silicon dioxide, and the phosphorus source is one or more of ammonium dihydrogen phosphate, sodium hydrogen phosphate, and trisodium phosphate dodecahydrate.

In some embodiments, the grinding solvent is one or more of ethanol, water, acetone, and isopropanol.

In some embodiments, the rotational speed of the ball milling pretreatment is 50 r/min-1000 r/min, and the ball milling time is 0.5 h-48 h.

In some embodiments, the speed of the sand milling nano-processing is 50 r/min to 1500 r/min, and the sand milling time is 0.5 h-48 h.

Specifically, according to the above-mentioned raw material ratio and treatment process, the particle size of zirconium source and silicon source material can be significantly reduced, and a uniform precursor slurry can be prepared. The sodium super ionic conductor solid electrolyte finally obtained has stable and continuous three-dimensional migration of sodium ions aisle.

In some embodiments, the plasma atmosphere is one or more of nitrogen, argon, helium, nitrogen-argon mixed gas, nitrogen-helium mixed gas, and argon-helium mixed gas.

In some embodiments, in the plasma-assisted spray-drying granulation step, the spray-drying temperature is 50° C.-300° C., and the pressure is 0 MPa-1 MPa.

Specifically, according to the above plasma atmosphere, temperature and pressure, the surface of sodium superionic conductor solid electrolyte particles is modified in-situ by plasma active groups to induce directional crystal growth. The free space dimension of the crystal growth is reduced during the crystallization process of the high-temperature solid phase sintered sodium super ionic conductor solid electrolyte precursor particles. Improve the dispersion stability of sodium super ionic conductor solid electrolyte precursor particles, and reduce the calcination temperature of solid-phase sintering. The sodium super ionic conductor solid electrolyte can have the advantages of crystal purity, good compactness, uniform particles, high ion conductivity, and the like.

In some embodiments, in the step of sintering the sodium super ionic conductor solid electrolyte precursor particles, the sintering temperature is 700° C.-1400° C., and the sintering time is 2 h-36 h.

Specifically, according to the above-mentioned sintering temperature, the sodium super ionic conductor solid electrolyte finally obtained has low porosity, high ion conductivity, mechanical properties and electrochemical properties. By adopting the above sintering time, the crystal integrity, particle size distribution uniformity and crystal plane orientation consistency of the sodium super ionic conductor solid electrolyte can be improved, and it has smaller grain boundary resistance, longer cycle stability, and more excellent electrochemical performance.

The sodium super ionic conductor solid electrolyte grains prepared by the above-mentioned low-dimensional crystallization method are regular hexahedral crystals, and the grain size distribution is uniform 3 μm-4 μm.

An embodiment of the present disclosure further provides a sodium super ionic conductor solid electrolyte, and the sodium super ionic conductor solid electrolyte is prepared by the above-mentioned low-dimensional crystallization method.

BRIEF DESCRIPTION OF THE DRAWINGS

In order to illustrate the technical solutions in the embodiments of the present application more clearly, the following will briefly introduce the drawings that are used in the embodiments. Apparently, the drawings in the following description are only some embodiments of the present application, and those skilled in the art can obtain other drawings according to these drawings without creative efforts.

DETAILED DESCRIPTION OF THE EMBODIMENTS

The present disclosure will be described in further detail below in conjunction with the accompanying drawings and specific embodiments, but the protection scope of the present invention is not limited to the content described.

As mentioned above, the preparation of sodium super ionic conductor solid electrolyte with good electrochemical performance still faces many scientific and technical challenges: sodium and phosphorus are extremely volatile at high temperature, resulting in the precipitation of zirconium dioxide, and the component content is not easy to control; the sodium super ionic conductor solid electrolyte prepared by the high-temperature solid-phase method is impure, uneven in particle size distribution, and low in ion conductivity. Among these challenges, an important challenge that needs to be solved urgently is to improve the particle uniformity, crystal integrity, and purity of solid electrolytes, and to overcome the problem of high interfacial impedance caused by inconsistent grain boundary orientations.

In an embodiment of the present disclosure, based on the growth element theory of anion coordination polyhedron, the low-temperature plasma is used as the protective gas of the spray drying equipment, and the powder material is modified and granulated while evaporating the sodium super ionic conductor solid electrolyte precursor slurry. The particle surface of sodium superionic conductor solid electrolyte precursor is modified in-situ by plasma active groups. The directional growth of the crystal is induced by the anion coordination polyhedron, which reduces the free space dimension of the crystal growth during the crystallization process of the high-temperature solid phase sintered sodium super ionic conductor solid electrolyte. Secondly, the dispersion stability of the sodium super ionic conductor solid electrolyte precursor particles is improved, and the calcination temperature of solid-phase sintering is reduced. The sodium super ionic conductor solid electrolyte has the advantages of good crystal purity, good compactness, uniform particles, and high ion conductivity.

Figure 1:
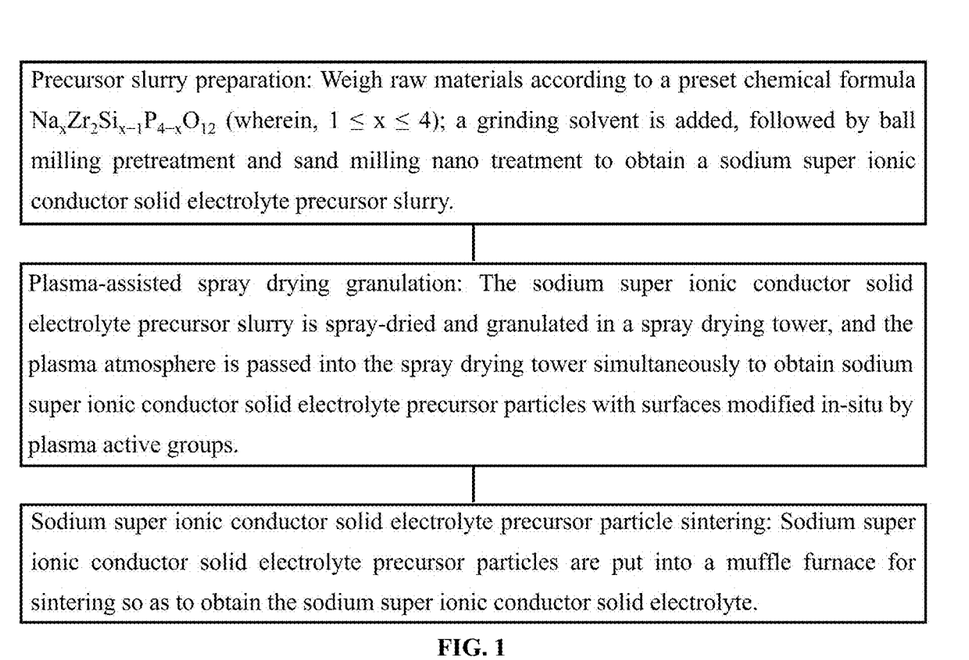
FIG. 1 is a schematic diagram of steps of preparing a sodium super ionic conductor solid electrolyte by low-dimensional crystallization according to an embodiment of the present disclosure.

Specifically, as shown in FIG. 1, the method for preparing a sodium super ionic conductor solid electrolyte by low-dimensional crystallization provided by an embodiment of the present disclosure includes the following steps:

Precursor slurry preparation: Weigh raw materials according to a preset chemical formula $Na_xZr_2Si_{x-1}P_{4-x}O_{12}$ ($1 \leq x \leq 4$), add grinding solvent, pretreatment by ball milling and sand milling to obtain sodium super ionic conductor solid electrolyte precursor slurry.

Plasma-assisted spray drying and granulation: spray-dry and granulate the sodium super ionic conductor solid electrolyte precursor slurry to obtain particles, and at the same time pass the plasma atmosphere into the spray drying tower; the surface of sodium superionic conductor solid electrolyte particles is modified in-situ by plasma active groups.

Sintering of sodium super ionic conductor solid electrolyte precursor particles: put sodium super ionic conductor solid electrolyte precursor particles into a muffle furnace, and obtain sodium super ionic conductor solid electrolyte through single sintering.

In the step of preparing the precursor slurry: weighing raw materials according to $1 \leq x \leq 4$ in the preset chemical formula $Na_xZr_2Si_{x-1}P_{4-x}O_{12}$. The sodium source in the raw materials is one or more of sodium chloride, sodium carbonate, sodium thiosulfate, sodium bicarbonate, sodium nitrate, and trisodium phosphate dodecahydrate. The zirconium source is zirconium dioxide, the silicon source is silicon dioxide, and the phosphorus source is one or more of ammonium dihydrogen phosphate, sodium hydrogen phosphate, and trisodium phosphate dodecahydrate.

In some embodiments, the grinding solvent is one or more of ethanol, water, acetone, and isopropanol.

In some embodiments, the rotational speed of the ball milling pretreatment is 50 r/min-1000 r/min, and the ball milling time is 0.5 h-48 h.

In some embodiments, the speed of the sand milling nano-processing is 50 r/min-1500 r/min, and the sand milling time is 0.5 h-48 h.

Specifically, according to the above-mentioned raw material ratio and treatment process, the particle size of zirconium source and silicon source material can be significantly reduced, and a uniform precursor slurry can be prepared.

The sodium super ionic conductor solid electrolyte finally obtained has a stable and continuous three-dimensional migration channel of sodium ions.

In some embodiments, the plasma atmosphere is one or more of nitrogen, argon, helium, nitrogen-argon mixed gas, nitrogen-helium mixed gas, and argon-helium mixed gas.

In some embodiments, in the plasma-assisted spray-drying granulation step, the spray-drying temperature is 50° C.-300° C., and the pressure is 0 MPa-1 MPa.

Specifically, according to the above plasma atmosphere, temperature and pressure, the surface of sodium super ionic conductor solid electrolyte particles is modified in-situ by plasma active groups to induce directional crystal growth. The free space dimension of the crystal growth is reduced comparing to that during the crystallization process of the high-temperature solid phase sintered sodium ionic conductor solid electrolyte precursor particles. Improve the dispersion stability of sodium super ionic conductor solid electrolyte precursor particles, and reduce the calcination temperature of solid-phase sintering. The sodium super ionic conductor solid electrolyte can have the advantages of good crystal purity, good compactness, uniform particles, high ion conductivity, and the like.

In some embodiments, in the step of sintering the sodium super ionic conductor solid electrolyte precursor particles, the sintering temperature is 700° C.-1400° C., and the sintering time is 2 h-36 h.

Specifically, according to the above-mentioned sintering temperature, the sodium super ionic conductor solid electrolyte finally obtained has low porosity, high ion conductivity, mechanical properties and electrochemical properties. By adopting the above sintering time, the crystal integrity, particle size distribution uniformity and crystal plane orientation consistency of the sodium super ionic conductor solid electrolyte can be improved, and it has smaller grain boundary resistance, longer cycle stability, and more excellent electrochemical performance.

The gains of the sodium super ionic conductor solid electrolyte prepared by the above-mentioned low-dimensional crystallization method are regular hexahedral crystals, and the grain size distribution is uniform 3 μm-4 μm.

It can be understood that in the method for preparing the sodium super ionic conductor solid electrolyte by low-dimensional crystallization, plasma active groups are used to in-situ modify the surface of the sodium super ionic conductor solid electrolyte precursor particle. The directional crystal growth is induced by the anion coordination polyhedron, which reduces the free space dimension of the crystal growth during the crystallization process of the high-temperature solid phase sintered sodium super ionic conductor solid electrolyte precursor particles. Improve the dispersion stability of sodium super ionic conductor solid electrolyte precursor particles, and reduce the calcination temperature of solid-phase sintering. The sodium super ionic conductor solid electrolyte has the advantages of high crystal purity and integrity, good compactness, uniform particles, high ion conductivity, and the like. Further, the above-mentioned low-dimensional crystallization process for preparing the sodium super ionic conductor solid electrolyte is simple, basically does not involve complex reaction processes, and reduces energy consumption and investment in equipment. In addition, basically no "three wastes" are generated in any process of the present disclosure, which conforms to concept of green industry and is friendly to the environment.

The First Comparative Example (Preparation of Sodium Super Ionic Conductor Solid Electrolyte by Traditional High-Temperature Solid-Phase Method)

(1) Precursor slurry preparation: Weigh trisodium phosphate dodecahydrate, zirconium dioxide, and silicon dioxide according to the preset chemical formula $Na_3Zr_2Si_2PO_{12}$; add ethanol as a grinding solvent, and obtain a mixture by mechanical ball milling at a speed of 550 r/min for 6 h.

(2) Primary blast drying: At 80° C., the grinding solvent is evaporated to obtain a uniformly mixed powder of trisodium phosphate dodecahydrate, zirconium dioxide and silicon dioxide.

(3) Primary sintering: Put the mixed powder into a muffle furnace and sinter at 1000° C. for 12 h to obtain a sodium super ionic conductor solid electrolyte precursor.

(4) Sand milling and nanosizing: add alcohol to the precursor, and use a sand mill to grind at 1100 r/min for 24 h to obtain a nanosized sodium super ionic conductor solid electrolyte precursor slurry.

(5) Secondary blast drying: At 80° C., the alcohol was evaporated to obtain nano-sized sodium super ionic conductor solid electrolyte precursor particles.

(6) Secondary sintering: The nano-sized sodium super ionic conductor solid electrolyte precursor particles were placed in a muffle furnace and kept at 1200° C. for 12 h to obtain a sodium super ionic conductor solid electrolyte.

In this comparative example, physical and electrochemical tests were carried out on the prepared sodium super ionic conductor solid electrolyte. The grain orientation of the sodium super ionic conductor solid electrolyte is inconsistent, the particle size distribution is uneven, and there are zirconium dioxide impurity phases and serious agglomeration phenomena. The total impedance of the solid electrolyte was as high as 920Ω, and the symmetric cell showed poor cycle performance with a polarization of 0.15 V.

The Second Comparative Example (Sodium Super Ionic Conductor Solid Electrolyte Prepared by Traditional High-Temperature Solid-State Sintering-Conventional Spray Drying)

(1) Precursor slurry preparation: Weigh trisodium phosphate dodecahydrate, zirconium dioxide, and silicon dioxide according to the preset chemical formula $Na_3Zr_2Si_2PO_{12}$. Ethanol was added as a grinding solvent, and a mixed solution was obtained by mechanical ball milling at a speed of 550 r/min for 6 h.

(2) Primary spraying: Introduce nitrogen gas into the spray drying tower, and evaporate the grinding solvent at 100° C. and 0.5 MPa to obtain a uniformly mixed powder of trisodium phosphate dodecahydrate, zirconium dioxide and silicon dioxide.

(3) Primary sintering: Put the mixed powder into a muffle furnace and sinter at 1000° C. for 12 h to obtain a sodium super ionic conductor solid electrolyte precursor.

(4) Sand milling and nanosizing: add alcohol to the precursor, and use a sand mill to grind at 1100 r/min for 24 h to obtain a nano-sized sodium super ionic conductor solid electrolyte precursor slurry.

(5) Secondary spraying: At 100° C. and 0.5 MPa, the alcohol was evaporated to obtain nano-sized sodium super ionic conductor solid electrolyte precursor particles.

(6) Secondary sintering: The nano-sized sodium super ionic conductor solid electrolyte precursor particles were placed in a muffle furnace and kept at 1200° C. for 12 h to obtain a sodium super ionic conductor solid electrolyte.

In this comparative example, physical and electrochemical tests were carried out on the prepared sodium super ionic conductor solid electrolyte. The sodium super ionic conductor solid electrolyte has inconsistent grain orientation, uneven particle size distribution, multiple impurity phases and serious agglomeration.

First Embodiment (1) Precursor slurry preparation: Weigh trisodium phosphate dodecahydrate, zirconium dioxide, and silicon dioxide according to the preset chemical formula $Na_3Zr_2Si_2PO_{12}$. Ethanol was added as a grinding solvent, and a mixed solution was obtained by mechanical ball milling at a speed of 250 r/min for 24 h, and a uniform sodium super ionic conductor solid electrolyte precursor slurry was obtained by nano-processing with sand milling at 1100 r/min for 24 h.

(2) Plasma-assisted spray drying granulation: Nitrogen plasma gas is passed into the spray drying tower, and the grinding solvent is evaporated at 100° C. and 0.5 MPa to obtain sodium super ionic conductor solid electrolyte precursor particles with surfaces modified in-situ by nitrogen plasma active groups.

(3) Sintering of sodium super ionic conductor solid electrolyte precursor particles: The sodium super ionic conductor solid electrolyte precursor particles with surfaces modified in-situ by plasma active groups were put into a muffle furnace and kept at 1100° C. for 15 h to obtain a sodium super ionic conductor solid electrolyte with uniform particle size.

Figure 2:
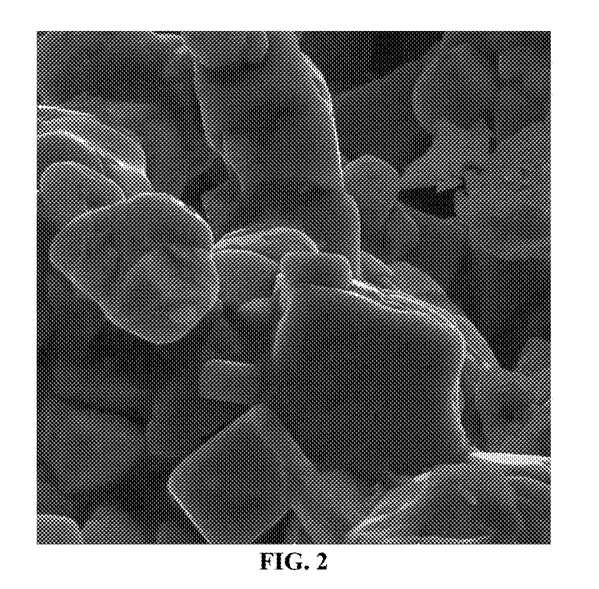
FIG. 2 is a scanning electron microscope image (SEM) of the sodium super ionic conductor solid electrolyte prepared by a traditional high-temperature solid-phase method obtained in a first comparative example.
Figure 3:
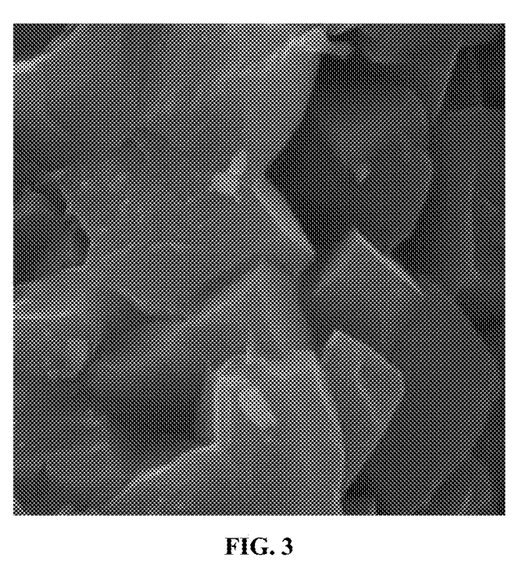
FIG. 3 is a scanning electron microscope image (SEM) of the sodium super ionic conductor solid electrolyte prepared by a traditional high-temperature solid-phase method-conventional spray drying obtained in a second comparative example.
Figure 4:
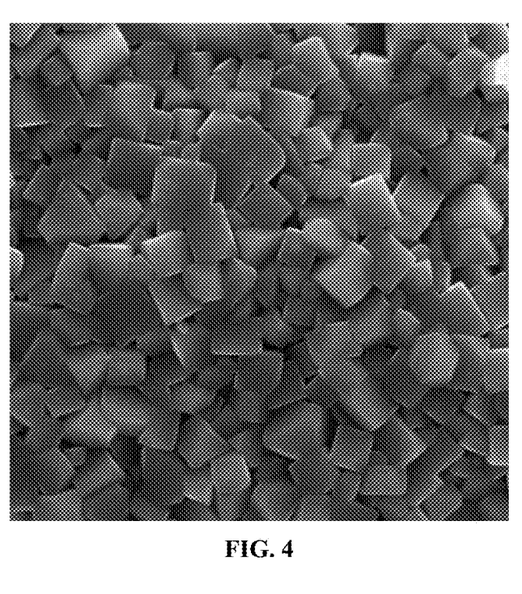
FIG. 4 is a scanning electron microscope image (SEM) of the sodium super ionic conductor solid electrolyte prepared by low-dimensional crystallization obtained from a first embodiment of the present disclosure.
Figure 5:
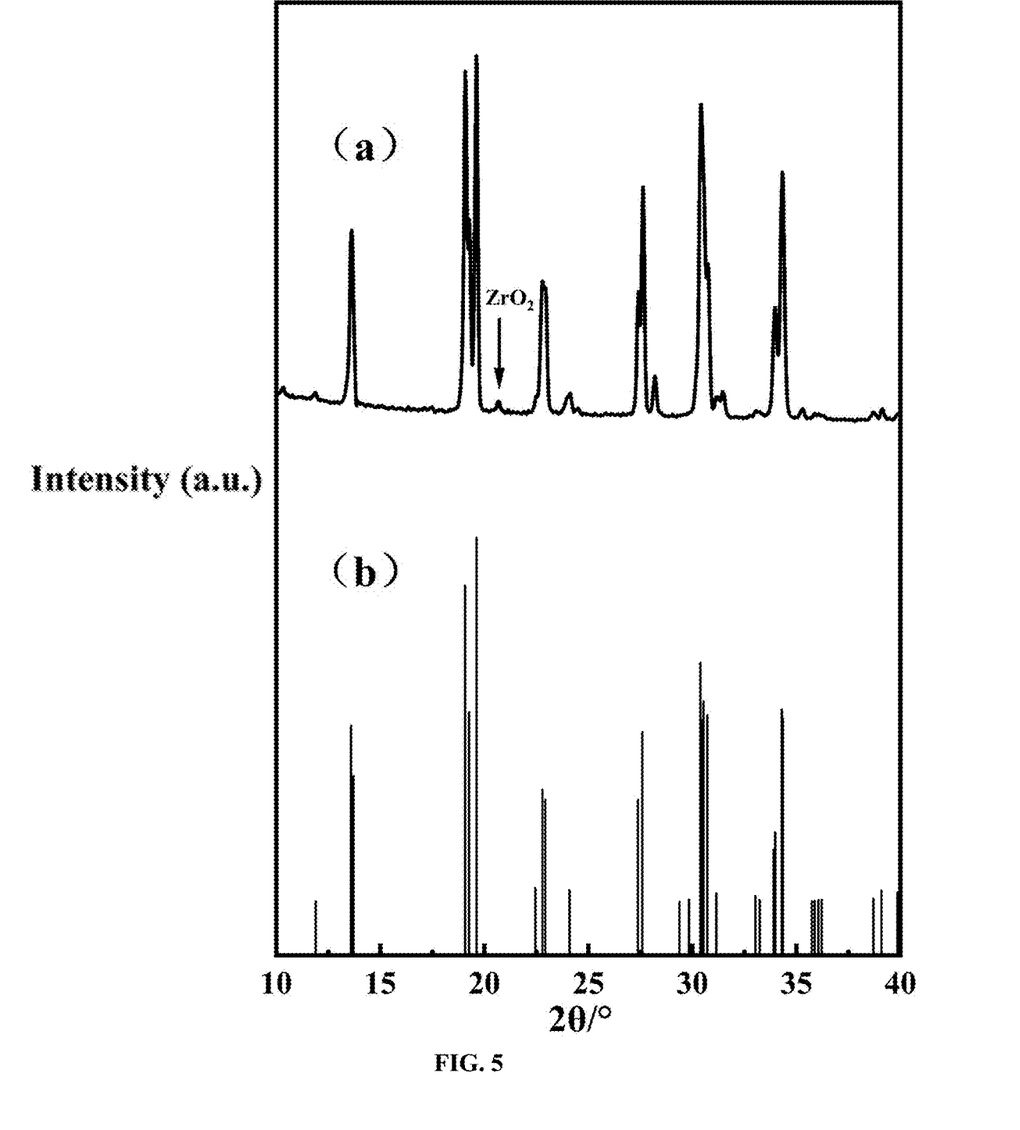
FIG. 5 is an X-ray diffraction pattern (XRD) of the sodium super ionic conductor solid electrolyte, where (a) the traditional high-temperature solid phase sample and (b) PDF 84-1200 standard card.
Figure 6:
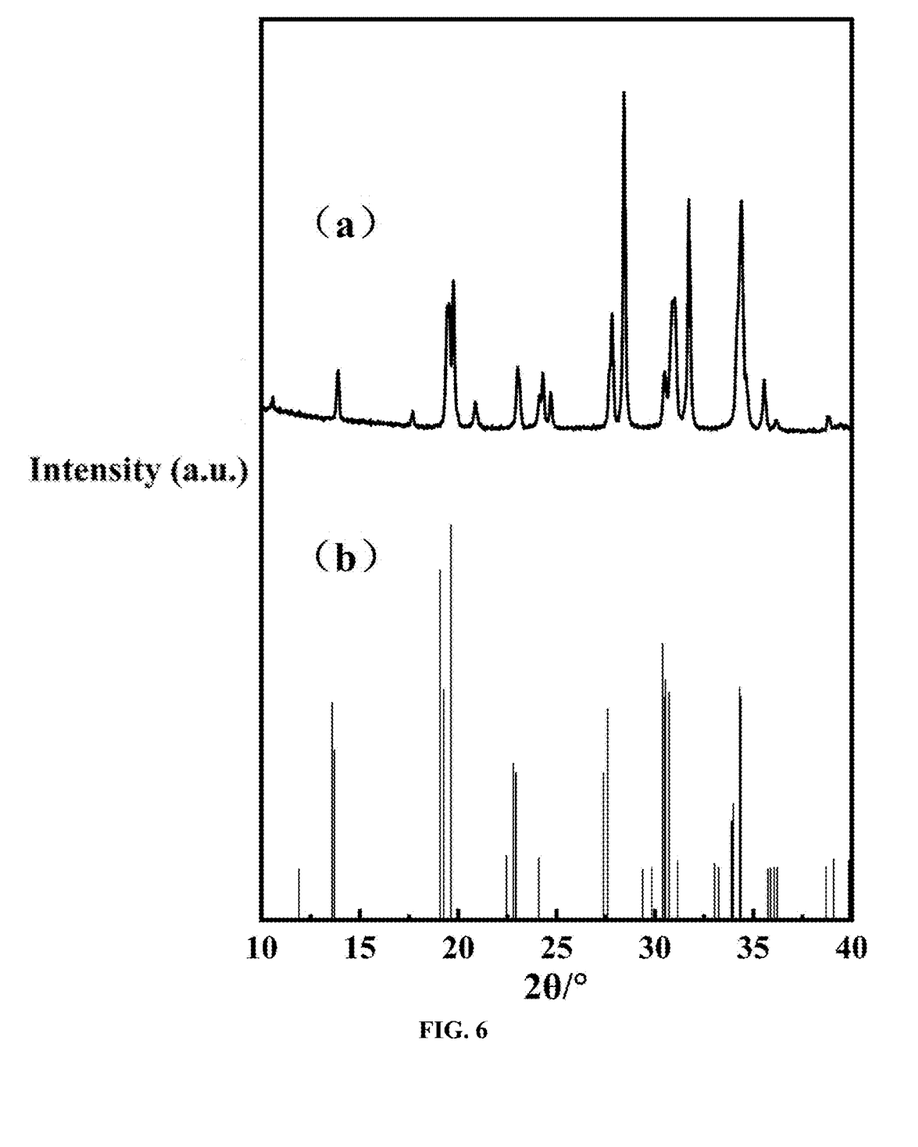
FIG. 6 is an X-ray diffraction pattern (XRD) of the sodium super ionic conductor solid electrolyte, where (a) the traditional high-temperature solid-phase method-conventional spray drying sample and (b) PDF 84-1200 standard card.
Figure 7:
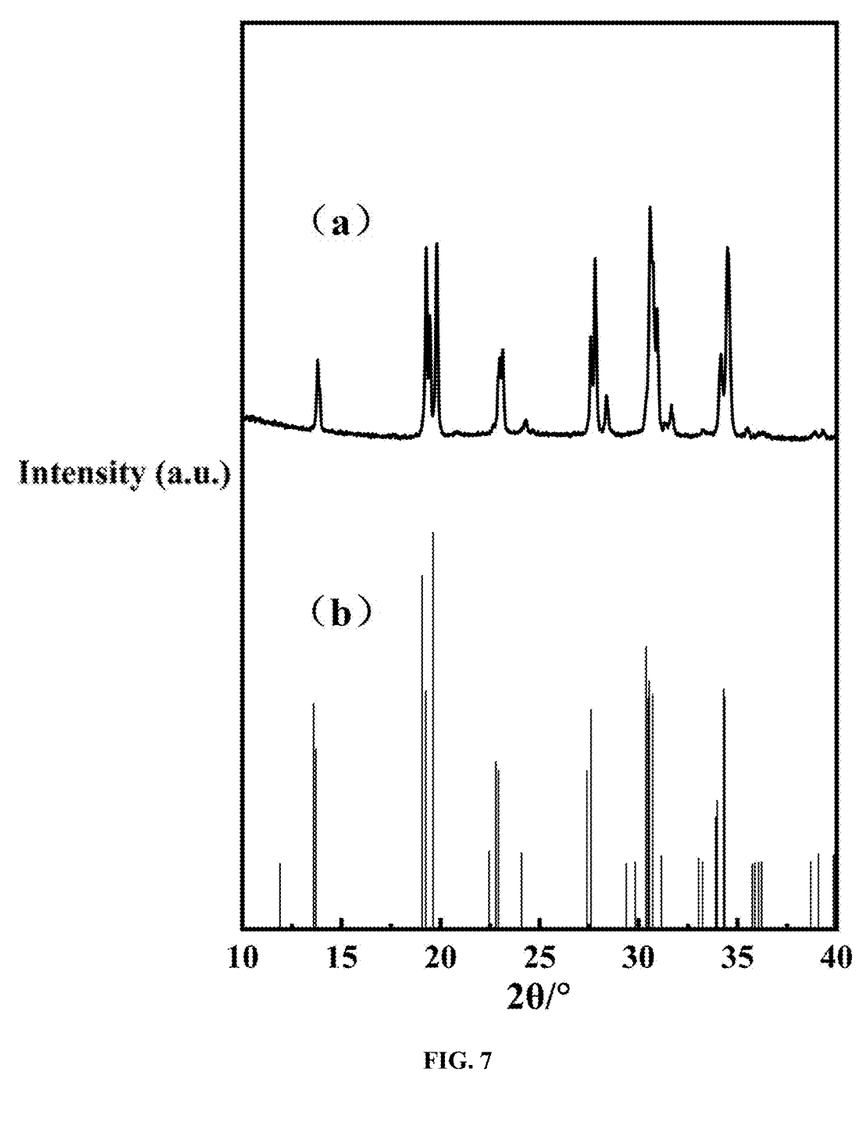
FIG. 7 is an X-ray diffraction pattern (XRD) of the sodium super ionic conductor solid electrolyte, where (a) the low-dimensional crystallization sample and (b) PDF 84-1200 standard card.
Figure 8:
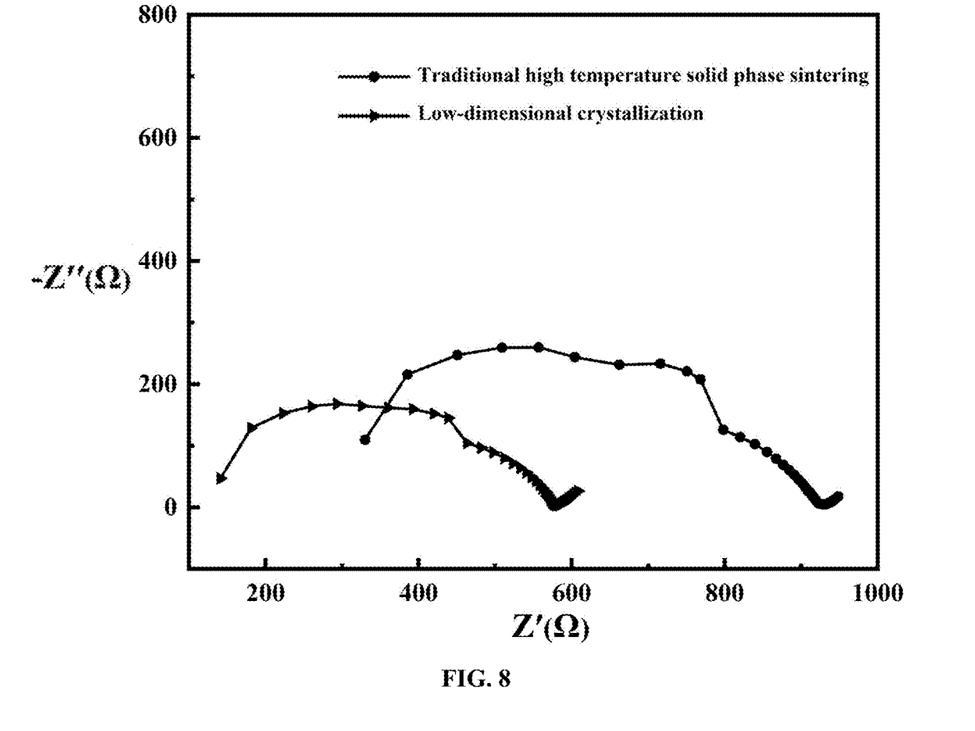
FIG. 8 is a comparison chart of electrochemical impedance spectroscopy (EIS) of sodium super ionic conductor solid electrolyte prepared by a traditional high-temperature solid-phase method in the first comparative example and a low-dimensional crystallization method in the first embodiment of the present disclosure.
Figure 9:
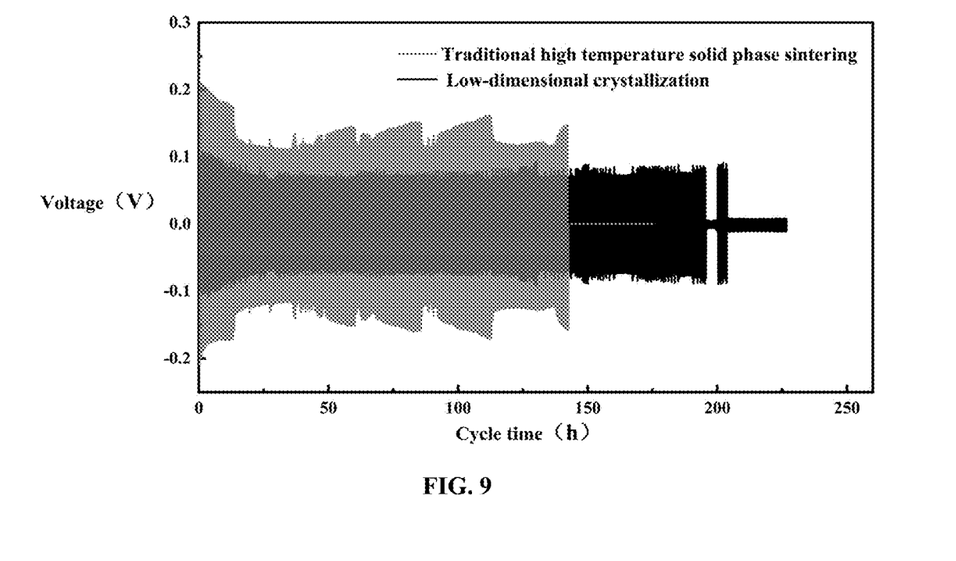
FIG. 9 is a cycle comparison chart of a symmetrical battery of a sodium super ionic conductor solid electrolyte (Na/sodium super ionic conductor solid electrolyte/Na) prepared by the first comparative example under the traditional high-temperature solid-phase method and the first embodiment of the present disclosure under a low-dimensional crystallization method.

In this example, physical and electrochemical tests were performed on the sodium super ionic conductor solid electrolyte prepared by low-dimensional crystallization. Comparing the scanning electron microscopes in FIG. 2, FIG. 3, and FIG. 4, it can be concluded that compared with traditional solid-state sintering, the sodium super ionic conductor solid electrolyte modified in-situ by nitrogen plasma active groups has uniform particle size, high crystal integrity, and crystal plane orientation unanimous. Comparing FIG. 5, FIG. 6 and FIG. 7, it can be seen that the crystal purity of the sodium super ionic conductor solid electrolyte modified in-situ by nitrogen plasma active groups is higher, and the impurity phase of zirconia is significantly reduced. It can be seen from FIG. 8 and FIG. 9 that compared with traditional solid-state sintering, the battery polarization of the sodium super ionic conductor solid electrolyte modified in-situ with nitrogen plasma active groups is reduced from 0.15 V to 0.08 V, and it can be stably cycled for 200 h above, the total impedance is reduced from 920Ω to 580Ω.

Second Embodiment (1) Precursor slurry preparation: Weigh trisodium phosphate dodecahydrate, zirconium dioxide, and silicon dioxide according to the preset chemical formula $Na_3Zr_2Si_2PO_{12}$. Ethanol was added as a grinding solvent, and the mixed solution was obtained by mechanical ball milling at a speed of 50 r/min for 5 h, and a uniform sodium super ionic conductor solid electrolyte precursor slurry was obtained by nano-processing with sand milling at 1500 r/min for 0.5 h.

(2) Plasma-assisted spray drying granulation: Nitrogen plasma gas is passed into the spray drying tower, and the grinding solvent is evaporated at 300° C. and 0.7 MPa to obtain sodium super ionic conductor solid electrolyte precursor particles with surfaces modified in-situ by nitrogen plasma active groups.

(3) Sintering of sodium super ionic conductor solid electrolyte precursor particles: The sodium super ionic conductor solid electrolyte precursor particles with surfaces modified in-situ by plasma active groups were put into a muffle furnace and kept at 700° C. for 5 h to obtain a sodium super ionic conductor solid electrolyte with uniform particle size.

Figure 10:
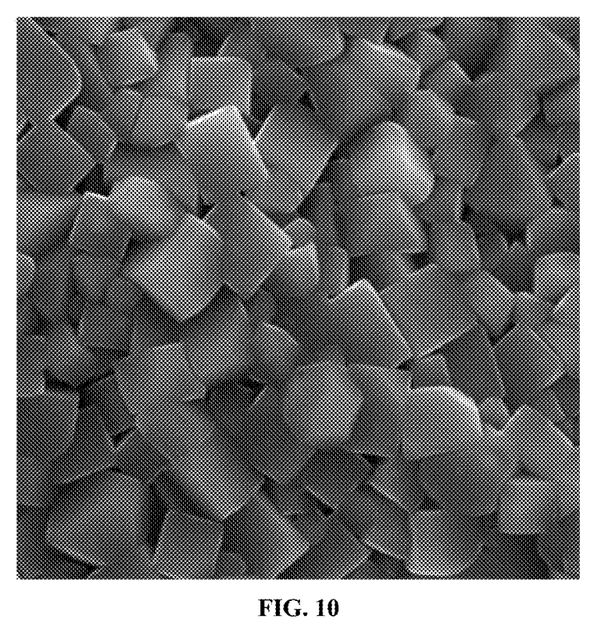
FIG. 10 is a scanning electron microscope image (SEM) of the sodium super ionic conductor solid electrolyte prepared by low-dimensional crystallization obtained in the second embodiment of the present disclosure.

As shown in FIG. 10, the sodium super ionic conductor solid electrolyte obtained in this example has uniform particle size, high crystal integrity, and consistent crystal plane orientation.

Third Embodiment (1) Precursor slurry preparation: Weigh trisodium phosphate dodecahydrate, zirconium dioxide, and silicon dioxide according to the preset chemical formula $Na_3Zr_2Si_2PO_{12}$. Ethanol was added as a grinding solvent, and the mixed solution was obtained by mechanical ball milling at a speed of 1000 r/min for 0.5 h, and a uniform sodium super ionic conductor solid electrolyte precursor slurry was obtained by nano-processing with sand milling at 50 r/min for 48 h.

(2) Plasma-assisted spray drying granulation: Nitrogen plasma gas is passed into the spray drying tower, and the grinding solvent is evaporated at 50° C. and 1 MPa to obtain sodium super ionic conductor solid electrolyte precursor particles with surfaces modified in-situ by nitrogen plasma active groups.

(3) Sintering of sodium super ionic conductor solid electrolyte precursor particles: The sodium super ionic conductor solid electrolyte precursor particles with surfaces modified in-situ by plasma active groups were put into a muffle furnace and kept at 900° C. for 2 h to obtain a sodium super ionic conductor solid electrolyte with uniform particle size.

Figure 11:
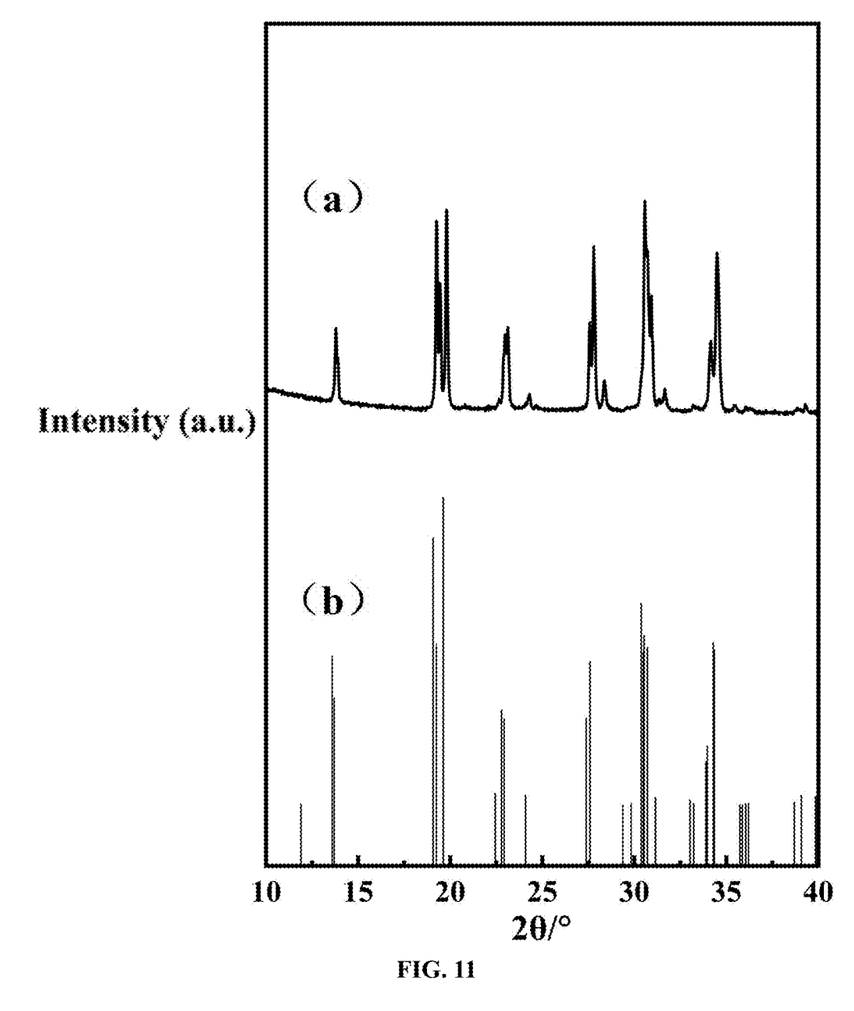
FIG. 11 is an X-ray diffraction pattern (XRD) of the sodium super ionic conductor solid electrolyte, where (a) the low-dimensional crystallization sample obtained in the third embodiment of the present disclosure and (b) PDF 84-1200 standard card.

As shown in FIG. 11, the XRD test of the sodium super ionic conductor solid electrolyte in this embodiment has the advantages of high crystal purity and significantly reduced zirconium dioxide impurity phase.

Fourth Embodiment (1) Precursor slurry preparation: Weigh trisodium phosphate dodecahydrate, zirconium dioxide, and silicon dioxide according to the preset chemical formula $Na_3Zr_2Si_2PO_{12}$. Ethanol was added as a grinding solvent, and the mixed solution was obtained by mechanical ball milling at a speed of 350 r/min for 1 h, and a uniform sodium super ionic conductor solid electrolyte precursor slurry was obtained by nano-processing with sand milling at 800 r/min for 4 h.

(2) Plasma-assisted spray drying granulation: Nitrogen plasma gas is passed into the spray drying tower, and the grinding solvent is evaporated at 150° C. and 0 MPa to obtain sodium super ionic conductor solid electrolyte precursor particles with surfaces modified in-situ by nitrogen plasma active groups.

(3) Sintering of sodium super ionic conductor solid electrolyte precursor particles: The sodium super ionic conductor solid electrolyte precursor particles with surfaces modified in-situ by plasma active groups were put into a muffle furnace and kept at 1400° C. for 2 h to obtain a sodium super ionic conductor solid electrolyte with uniform particle size.

Figure 12:
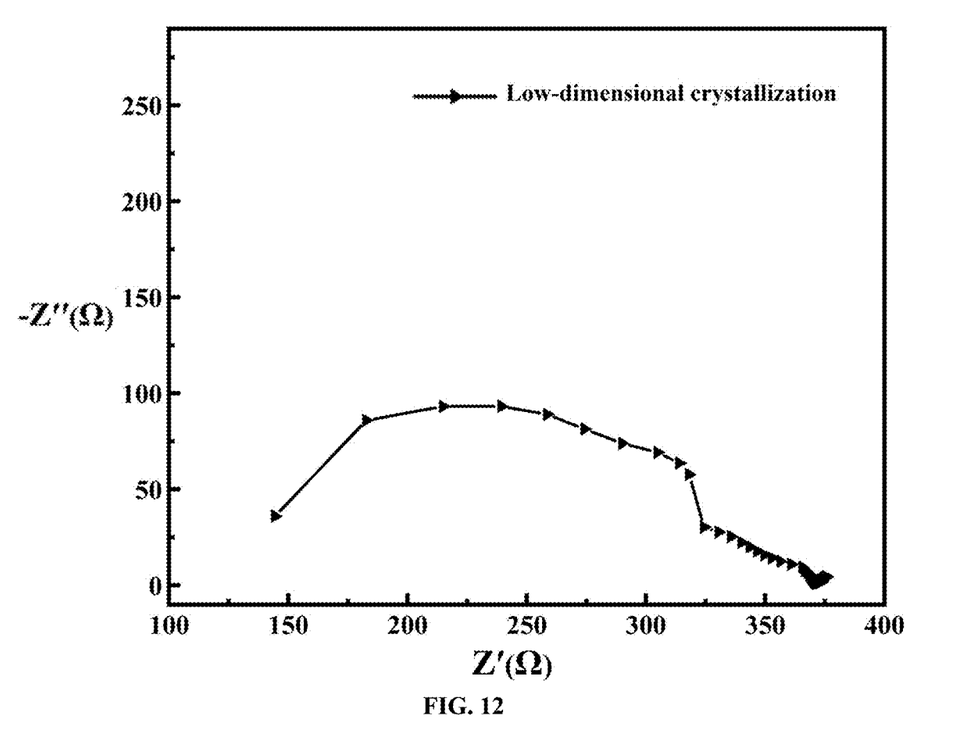
FIG. 12 is an Electrochemical Impedance Spectroscopy (EIS) of sodium super ionic conductor solid electrolyte prepared by low-dimensional crystallization obtained in the fourth embodiment of the present disclosure.

As shown in FIG. 12, in this embodiment, the EIS test was performed on the sodium super ionic conductor solid electrolyte modified in-situ by the plasmonic active groups, and the total impedance was significantly reduced to 370Ω.

Fifth Embodiment (1) Precursor slurry preparation: Weigh trisodium phosphate dodecahydrate, zirconium dioxide, and silicon dioxide according to the preset chemical formula $Na_3Zr_2Si_2PO_{12}$. Ethanol was added as a grinding solvent, and the mixed solution was obtained by mechanical ball milling at a speed of 350 r/min for 1 h, and a uniform sodium super ionic conductor solid electrolyte precursor slurry was obtained by nano-processing with sand milling at 800 r/min for 4 h.

(2) Plasma-assisted spray drying granulation: Nitrogen plasma gas is passed into the spray drying tower, and the grinding solvent is evaporated at 150° C. and 0 MPa to obtain sodium super ionic conductor solid electrolyte precursor particles with surfaces modified in-situ by nitrogen plasma active groups.

(3) Sintering of sodium super ionic conductor solid electrolyte precursor particles: The sodium super ionic conductor solid electrolyte precursor particles with surfaces modified in-situ by plasma active groups were put into a muffle furnace and kept at 900° C. for 5 h to obtain a sodium super ionic conductor solid electrolyte with uniform particle size.

In this embodiment, physical and electrochemical tests are carried out on the sodium super ionic conductor solid electrolyte modified in-situ by the plasma active groups, and compared with the untreated one, it has relatively lower impedance and polarization, and a longer cycle life.

Sixth Embodiment (1) Precursor slurry preparation: Weigh trisodium phosphate dodecahydrate, zirconium dioxide, and silicon dioxide according to the preset chemical formula $Na_3Zr_2Si_2PO_{12}$. Ethanol was added as a grinding solvent, and the mixed solution was obtained by mechanical ball milling at a speed of 350 r/min for 1 h, and a uniform sodium super ionic conductor solid electrolyte precursor slurry was obtained by nano-processing with sand milling at 1100 r/min for 8 h.

(2) Plasma-assisted spray drying granulation: Nitrogen plasma gas is passed into the spray drying tower, and the grinding solvent is evaporated at 150° C. and 0.9 MPa to obtain sodium super ionic conductor solid electrolyte precursor particles with surfaces modified in-situ by nitrogen plasma active groups.

(3) Sintering of sodium super ionic conductor solid electrolyte precursor particles: The sodium super ionic conductor solid electrolyte precursor particles with surfaces modified in-situ by plasma active groups were put into a muffle furnace and kept at 900° C. for 8 h to obtain a sodium super ionic conductor solid electrolyte with uniform particle size.

In this embodiment, physical and electrochemical tests are carried out on the sodium super ionic conductor solid electrolyte modified in-situ by the plasma active group, and compared with the untreated one, it has relatively lower impedance and polarization, and a longer cycle life.

Seventh Embodiment (1) Precursor slurry preparation: Weigh trisodium phosphate dodecahydrate, zirconium dioxide, and silicon dioxide according to the preset chemical formula $Na_3Zr_2Si_2PO_{12}$. Ethanol was added as a grinding solvent, and the mixed solution was obtained by mechanical ball milling at a speed of 400 r/min for 1 h, and a uniform sodium super ionic conductor solid electrolyte precursor slurry was obtained by nano-processing with sand milling at 1100 r/min for 8 h.

(2) Plasma-assisted spray drying granulation: Nitrogen plasma gas is passed into the spray drying tower, and the grinding solvent is evaporated at 150° C. and 0.9 MPa to obtain sodium super ionic conductor solid electrolyte precursor particles with surfaces modified in-situ by nitrogen plasma active groups.

(3) Sintering of sodium super ionic conductor solid electrolyte precursor particles: The sodium super ionic conductor solid electrolyte precursor particles with surfaces modified in-situ by plasma active groups were put into a muffle furnace and kept at 1000° C. for 6 h to obtain a sodium super ionic conductor solid electrolyte with uniform particle size.

In this embodiment, physical and electrochemical tests are carried out on the sodium super ionic conductor solid electrolyte modified in-situ by the plasma active group, and compared with the untreated one, it has relatively lower impedance and polarization, and a longer cycle life.

Eighth Embodiment (1) Precursor slurry preparation: Weigh trisodium phosphate dodecahydrate, zirconium dioxide, and silicon dioxide according to the preset chemical formula $Na_3Zr_2Si_2PO_{12}$. Ethanol was added as a grinding solvent, and the mixed solution was obtained by mechanical ball milling at a speed of 350 r/min for 48 h, and a uniform sodium super ionic conductor solid electrolyte precursor slurry was obtained by nano-processing with sand milling at 1100 r/min for 8 h.

(2) Plasma-assisted spray drying granulation: Nitrogen plasma gas is passed into the spray drying tower, and the grinding solvent is evaporated at 110° C. and 0.9 MPa to obtain sodium super ionic conductor solid electrolyte precursor particles with surfaces modified in-situ by nitrogen plasma active groups.

(3) Sintering of sodium super ionic conductor solid electrolyte precursor particles: The sodium super ionic conductor solid electrolyte precursor particles with surfaces modified in-situ by plasma active groups were put into a muffle furnace and kept at 1200° C. for 36 h to obtain a sodium super ionic conductor solid electrolyte with uniform particle size.

In this embodiment, physical and electrochemical tests are carried out on the sodium super ionic conductor solid electrolyte modified in-situ by the plasma active group, and compared with the untreated one, it has relatively lower impedance and polarization, and a longer cycle life.

The above-mentioned embodiment is a preferred embodiment of the present invention, but the embodiment of the present invention is not limited by the above-mentioned embodiment, any other changes, modifications, substitutions, combinations and simplifications that deviate from the spirit and principle of the present invention, all should be equivalent replacement methods, and are all included in the protection scope of the present invention.

What is claimed is:

1. Method for preparing a sodium super ionic conductor solid electrolyte by low-dimensional crystallization, comprising the following steps:
Precursor slurry preparation:
weighing raw materials according to a preset chemical formula $Na_xZr_2Si_{x-1}P_{4-x}O_{12}$ (wherein, $1 \leq x \leq 4$);
adding the raw materials into a grinding solvent to obtain a first solution;
pretreating the first solution by ball milling to obtain a second solution; and
nano treating the second solution by sand milling to obtain a sodium super ionic conductor solid electrolyte precursor slurry;

Plasma-assisted spray drying granulation:
    spray-drying and granulating the sodium super ionic conductor solid electrolyte precursor slurry in a spray drying tower; and
    feeding plasma atmosphere into the spray drying tower simultaneously to obtain sodium super ionic conductor solid electrolyte precursor particles with surfaces modified in-situ by plasma active groups; and
Sodium super ionic conductor solid electrolyte precursor particle sintering:
    putting the sodium super ionic conductor solid electrolyte precursor particles into a muffle furnace and sintering to obtain the sodium super ionic conductor solid electrolyte.

2. The method according to claim 1, wherein,
a sodium source in the raw material is one or more of sodium chloride, sodium carbonate, sodium thiosulfate, sodium bicarbonate, sodium nitrate, and trisodium phosphate dodecahydrate;
a zirconium source is zirconium dioxide;
a silicon source is silicon dioxide; and
a phosphorus source is one or more of ammonium dihydrogen phosphate, sodium hydrogen phosphate, and trisodium phosphate dodecahydrate.

3. The method according to claim 1, wherein, the grinding solvent is one or more of ethanol, water, acetone, and isopropanol.

4. The method according to claim 1, wherein, in the step of precursor slurry preparation, a rotational speed of the ball milling is 50 r/min-1000 r/min, and ball milling time is 0.5 h-48 h.

5. The method according to claim 1, wherein, a speed of the sand-milling is 50 r/min-1500 r/min, and sand-milling time is 0.5 h-48 h.

6. The method according to claim 1, wherein, the plasma atmosphere is one or more of nitrogen, argon, helium, nitrogen-argon mixed gas, nitrogen-helium mixed gas, and argon-helium mixed gas.

7. The method according to claim 1, wherein, in the step of plasma-assisted spray drying and granulation, a spray drying temperature is 50° C.-300° C., and a pressure is 0 Mpa-1 Mpa.

8. The method according to claim 1, wherein, in the step of sodium super ionic conductor solid electrolyte precursor particle sintering, a sintering temperature is 700° C.-1400° C., and sintering time is 2 h-36 h.

9. The method according to claim 1, wherein, the sodium super ionic conductor solid electrolyte is in a form of regular hexahedral crystals with a particle size of 3 μm-4 μm.

10. A sodium super ionic conductor solid electrolyte, wherein the sodium super ionic conductor solid electrolyte is prepared by the preparation methods in claim 1.

* * * * *